Dec. 8, 1959 E. G. EYLES 2,916,259
WIRE GUIDE
Filed Dec. 13, 1955
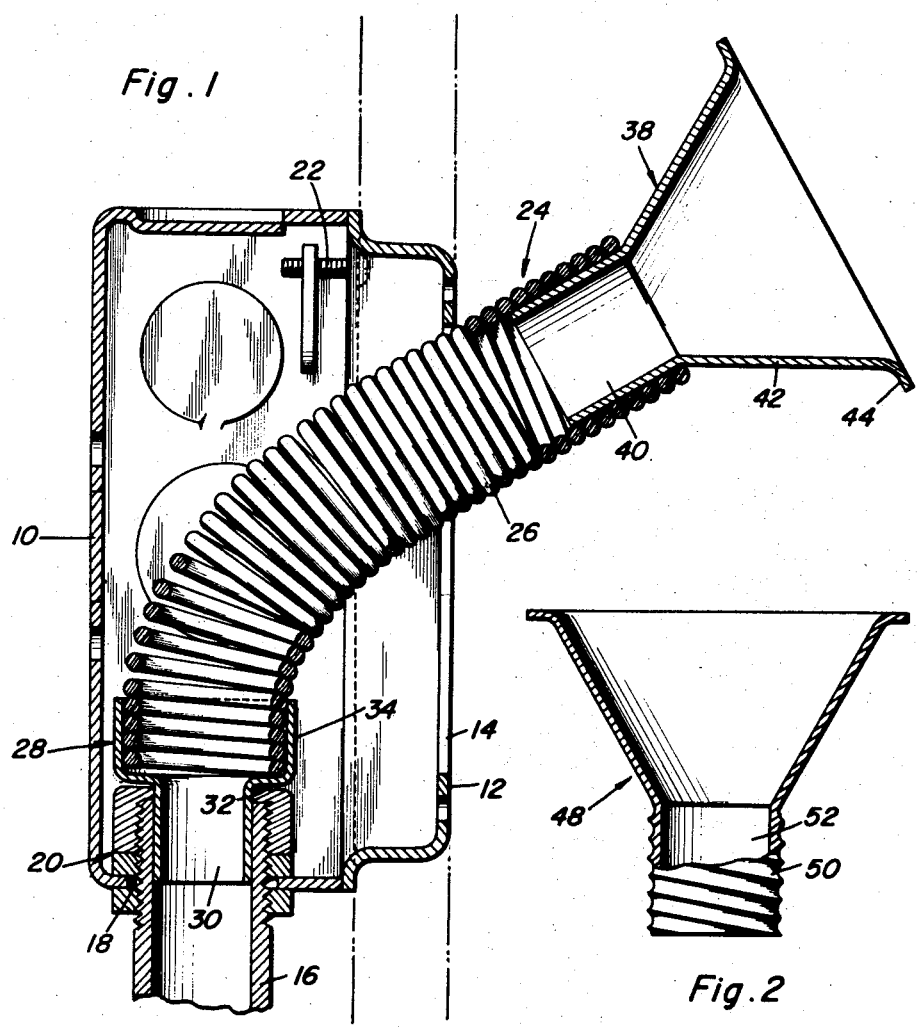
Fig. 1
Fig. 2
Fig. 3
Edward G. Eyles
INVENTOR.
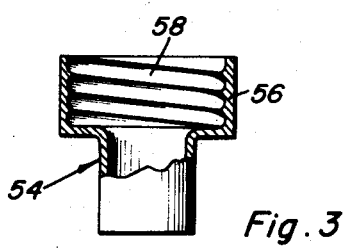
Attorneys

United States Patent Office 2,916,259
Patented Dec. 8, 1959

2,916,259
WIRE GUIDE

Edward G. Eyles, Fitchburg, Mass.

Application December 13, 1955, Serial No. 552,803

2 Claims. (Cl. 254—134.3)

This invention relates to improvements in electrician's tools and particularly to a guide which is useful for passing wires into conduits that are attached to electrical boxes.

The primary object of the invention is to provide a practical device for aiding the electrician in pulling through a conduit when the conduit is attached to an electrical box or the like. This object is achieved by having a flexible tube that is deformable to fit into the front opening of the box even when there is a plaster cover on the box, this tube having a funnel-shaped guide at one end and a specially devised coupling at the opposite end that slips into the conduit so that the wire is far more easily threaded through the box and into the conduit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal sectional view of a typical, standard electrical box with a conduit coupled to it and provided with a plaster cover, this box having the wire guide applied thereto as it appears when in use;

Figure 2 is a sectional view of a modified guiding end, this being coupled with the flexible tube by threads, while the equivalent part of Figure 1 is coupled to the tube by fitting snug and depending on the frictional bond between the inner surface of the tube and the outer surface of the wire guiding means; and Figure 3 is a modified coupling for use at the opposite end of the flexible tube.

In Figure 1, a conventional electrical outlet box 10 is shown, this box being provided with a plaster cover 12. Opening 14 is at the front of the plaster cover in order to accept a switch, female socket or the like. Conduit 16 is passed through one of the apertures 18 in one wall of the box 10 and is held in place by a standard coupling 20. Such other parts of the box as are conventional, for example, screws 22 to hold the plaster cover 12, are understood to be included.

Wire guide 24 consists of a tube 26 that is made flexible and resilient. One material that may be used is a rather tightly wound coil spring. A quickly connectible coupling 28 is provided at one end of tube 26. It consists of a sleeve 30 that is slipped in the open end of conduit 16. An annular laterally extending flange 32 is integrally or otherwise connected with one end of sleeve 30. It has at its edge a collar 34 in which the end of tube 26 is fitted. Due to the dimensioning of collar 34 and the diameter of tube 26, the coupling 28 is held firmly in place on the tube by the frictional bond therebetween. The lower end of tube 26 seats upon flange 32 constituting the lower limit of penetration of the tube into the collar 34.

The opposite end of tube 26 is fitted with a guide 38. The guide consists of a sleeve 40 whose outer surface is in frictional engagement with the inner surface of the outer end of tube 26. The frictional bond between these surfaces hold the guide 38 in place.

The bell or funnel-shaped end 42 of guide 38 has a laterally extending flange 44 at the outer end thereof. The diameter across the mouth of the guide 38 is considerably larger than the diameter of the tube 26 in order to have the wire smoothly guided as it passes into the wire guide 24.

In Figure 2 there is a modification illustrated wherein the guide 48 is the same in all respects to the guide 38 with the exception of the threads 50 on sleeve 52. The sleeve 52 is equivalent to and corresponds with sleeve 40. The purpose of the threads 50 is to enhance the frictional bond between the sleeve and the tube 26 by having guide 48 threaded in place.

In Figure 3, a similar modification is illustrated. Here the coupling 54 is similar in function to the coupling 28. However, collar 56 thereof has threads 58 engageable with the coils of the tube 26. This helps to hold the coupling 54 firmly secure on the end of the tube 26.

In operation, a snake or fish wire is placed into the conduit. The wire guide 24 is then slipped over the fish wire and sleeve 30 is slipped into the inner end of conduit 16 with tube 26 deformed so that it passes through the opening in the electrical outlet box and particularly a plaster cover 12 thereon. Particular note is made of the plaster cover in that it reduces the frontal or side opening of the electrical box considerably making it essential to have the flexibility of tube 26 present in order to have the guide slide in place.

The wires that are to be pulled into the conduit are then attached to the fish wire and are guided into the conduit by the guide 38 on the end of the wire guide 24. Due to the shape of the guide 38 or 48, the electrican need not guide the wire into tube 26. Rather, it automatically feeds into the tube as it is being pulled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with an electrical box having an opening and a conduit connector having a wire passage which opens into the box, a wire guide comprising a flexible and resilient tube adapted to be distorted to fit into the opening of said box, a coupling which includes a cylindrical collar connected to one end of said tube and a smaller diameter sleeve adapted to fit in the wire passage of said connector, means to guide the wire into the opposite end of said tube including a sleeve connected to said opposite end of said tube, and an outwardly flared guide on the last-mentioned sleeve.

2. The wire guide of claim 1, wherein there is an inwardly directed shoulder at the junction of said cylindrical collar and said smaller diameter sleeve, said shoulder being adapted to limit the inward penetration of said smaller diameter sleeve with respect to said conduit connector and the conduit held by said connector, and said smaller diameter sleeve having a smooth outer surface which fits within said connector and conduit so that the guide has a sliding connection with the wire passage in the connector and conduit.

References Cited in the file of this patent

UNITED STATES PATENTS

| | | |
|---|---|---|
| 1,191,886 | Glauber | July 18, 1916 |
| 1,801,171 | Mueller et al. | Apr. 14, 1931 |
| 2,515,724 | McCroskey | July 18, 1950 |
| 2,665,147 | Wiesmann | Jan. 5, 1954 |
| 2,746,716 | Zachary | May 22, 1956 |
| 2,838,280 | Eyles | June 10, 1958 |

FOREIGN PATENTS

| | | |
|---|---|---|
| 617,656 | Germany | Aug. 23, 1935 |